US008694551B2

(12) United States Patent
Ramamurthy et al.

(10) Patent No.: US 8,694,551 B2
(45) Date of Patent: Apr. 8, 2014

(54) AUDITING QUERIES USING QUERY DIFFERENTIALS

(76) Inventors: Ravishankar Ramamurthy, Redmond, WA (US); Kaushik Shiriraghav, Bellevue, WA (US)

(*) Notice: Subject to any disclaimer, the term of this patent is extended or adjusted under 35 U.S.C. 154(b) by 68 days.

(21) Appl. No.: 12/963,506

(22) Filed: Dec. 8, 2010

(65) Prior Publication Data

US 2012/0150841 A1 Jun. 14, 2012

(51) Int. Cl.
*G06F 7/00* (2006.01)

(52) U.S. Cl.
USPC .......................................................... 707/802

(58) Field of Classification Search
USPC .......................................... 707/802, 799, 713
See application file for complete search history.

(56) References Cited

U.S. PATENT DOCUMENTS

| | | | |
|---|---|---|---|
| 7,085,760 B2 | 8/2006 | Dettinger et al. | |
| 7,810,142 B2 | 10/2010 | Agrawal et al. | |
| 2004/0068488 A1* | 4/2004 | Dettinger et al. | 707/3 |
| 2005/0097149 A1 | 5/2005 | Vaitzblit et al. | |
| 2006/0206477 A1* | 9/2006 | Dalvi et al. | 707/5 |
| 2006/0248084 A1 | 11/2006 | Sack et al. | |
| 2007/0143289 A1* | 6/2007 | Dwork et al. | 707/9 |
| 2009/0006380 A1 | 1/2009 | Agrawal et al. | |
| 2009/0055365 A1 | 2/2009 | Ager et al. | |
| 2009/0112805 A1* | 4/2009 | Garbow et al. | 707/3 |

OTHER PUBLICATIONS

Johnson, et al., "Compliance with data protection laws using Hippocratic Database active enforcement and auditing", Retrieved at << http://citeseerx.ist.psu.edu/viewdoc/download?doi=10.1.1.111.1094&rep=rep1&type=pdf >>, IBM Systems Journal, vol. 46, No. 2, 2007, pp. 255-264.
Mullins, Craig, "Database Access Auditing: Who Did What to Which Data When?", Retrieved at << http://www.information-management.com/infodirect/20070824/1089701-1.html >>, Aug. 2007, pp. 3.
Konstantas, Johnnie, "You are spending too much on data access auditing", Retrieved at << http://www.scmagazineus.com/you-are-spending-too-much-on-data-access-auditing/article/108561/>>, Apr. 1, 2008, pp. 8.
"Database Auditing", Retrieved at << http://en.wikipedia.org/wiki/Database audit >>, Retrieved Date: Oct. 6, 2010, pp. 8.
"Guardium", Retrieved at << http://www.guardium.com >>, Retrieved Date: Oct. 6, 2010, pp. 3.
"Lumigent", Retrieved at <<http://www.lumigent.com/database-auditdb.html >>, pp. 2.
"Oracle Audit Vault", Retrieved at << http://www.oracle.com/us/products/database/audit-vault-066522.html. >>, Oct. 6, 2010, p. 1.

(Continued)

Primary Examiner — Truong Vo
(74) Attorney, Agent, or Firm — Dan Choi; Carole Boelitz; Micky Minhas

(57) ABSTRACT

Methods and systems for auditing queries using query differentials are disclosed. A method includes identifying a set of queries, determining if results of each query of the set of queries are different from results of respective differentials of each query of the set of queries, and based on the determining, making a characterization of each query of the set of queries as one of safe and unsafe. Access is provided to the characterization of each query of the set of queries.

20 Claims, 14 Drawing Sheets

(56) References Cited

OTHER PUBLICATIONS

Agrawal, et al., "Auditing Compliance with a Hippocratic Database", Retrieved at << http://www.cs.cmu.edu/~christos/PUBLICATIONS/vldb04-compliance >>, Proceedings of the 30th VLDB conference, 2004, pp. 12.

Motwani, et al., "Auditing SQL Queries", Retrieved at << http://infolab.stanford.edu/~dilys/papers/auditingsql.pdf >>,2007, pp. 20.

Miklau, et al., "A Formal Analysis of Information Disclosure in Data Exchange", Retrieved at << http://www.cs.washington.edu/homes/suciu/miklau_suciu_jcsspreprint.pdf >>, Mar. 3, 2006, pp. 46.

"The TPC-H Benchmark", Retrieved at << http://www.tpc.org >>, Retrieved Date: Oct. 7, 2010, p. 1.

Dwork, Cynthia, "Differential Privacy", Retrieved at << http://research.microsoft.com/en-us/projects/databaseprivacy/dwork.pdf >>, 2008, pp. 12.

Gupta, et al., "Maintenance of Materialized Views: Problems, Techniques and Applications", Retrieved at << http://www.csd.uoc.gr/~hy562/Papers/maintenance.pdf >>, 1999, pp. 16.

"SQL Server 2008 Extended Events", Retrieved at << http://msdn.microsoft.com/en-us/library/bb630354.aspx >>, May 19, 2009, pp. 3.

Kabra, et al., "Redundancy and Information Leakage in Fine-Grained Access Control", Retrieved at << http://www.cse.iitb.ac.in/~sudarsha/Pubs-dir/FGA-sigmod06.pdf >>, Proceedings of the 2006 ACM SIGMOD international conference on Management of Data and Symposium on Principles Database and Systems, Jun. 27-29, 2006, pp. 12.

Jayram, et al., "The Containment Problem for Real Conjunctive Queries with Inequalities", Retrieved at << http://citeseerx.ist.psu.edu/viewdoc/download?doi=10.1.1.84.291&rep=rep1&type=pdf >>, Jun. 26-28, 2006, pp. 80-89.

Miklau, et al., "A Formal Analysis of Information Disclosure in Data Exchange", Retrieved at << http://citeseerx.ist.psu.edu/viewdoc/download?doi=10.1.1.98.9451&rep=rep1&type=pdf >>, Jun. 13-18, 2004, pp. 12.

Fabbri, et al., "PolicyReplay: Misconfiguration—Response Queries for Data Breach Reporting", Retrieved at <<http://www.eecs.umich.edu/~klefevre/AuditProject_files/policy-replay.pdf >>, Proceedings of the VLDB Endowment, vol. 3, No. 1, 2010, pp. 12.

Graefe, Goetz, "Volcano—An Extensible and Parallel Query Evaluation System", Retrieved at << http://citeseerx.ist.psu.edu/viewdoc/download?doi=10.1.1.85.5009&rep=rep1&type=pdf>>, IEEE Transactions on Knowledge and Data Engineering, vol. 6., No. 1, Feb. 1994, pp. 120-135.

Pirahesh, et al., "A Rule Engine for Query Transformation in Starburst and IBM DB2 C/S DBMS", Retrieved at << http://citeseerx.ist.psu.edu/viewdoc/download?doi=10.1.1.91.4414&rep=rep1&type=pdf >>, 1997, pp. 391-400.

Galindo-Legaria, et al., "Orthogonal Optimization of Subqueries and Aggregation", Retrieved at << http://www.diku.dk/OLD/undervisning/2003f/729/papers/subqueries.pdf >>, May 21-24, 2001, pp. 571-581.

Chaudhuri, et al., "AutoAdmin 'What-if' Index Analysis Utility", Retrieved at << http://citeseerx.ist.psu.edu/viewdoc/download?doi=10.1.1.126.6699&rep=rep1&type=pdf >>, 1998, pp. 367-378.

Levy, Alon Y, "Answering Queries Using Views: A Survey", Retrieved at << http://www.cs.uwaterloo.ca/~david/cs740/answering-queries-using-views.pdf >>, 2001, pp. 1-42.

Guravannavar, "Optimizing Nested Queries with Parameter Sort Orders", Proceedings of the 31st VLDB Conference, Aug. 30-Sep. 2, 2005.

Hammer, "Knowledge-Based Query Processing", Sixth International Conference on Very Large Data Bases, Oct. 1-3, 1980.

Kaushik, "Efficient Auditing for Complex SQL Queries", Jun. 2011.

King, "Quist: A System for Semantic Query Optimization in Relational Databases", Proceedings of the 7th International Conference on Very Large Data Bases, Sep. 9-11, 1981.

Machanavajjhala, "On the Efficiency of Checking Perfect Privacy", 25th ACM SIGMOD-SIGACT-SIGART Symposium on Principles of Database Systems, Jun. 26-29, 2006.

Rizvi, "Extending Query Rewriting Techniques for Fine-Grained Access Control", Proceedings of the 2004 ACM SIGMOD International Conference on Management of Data, Jun. 13-18, 2004.

"Special Issue on Self-Managing Systems", IEEE Data Engineering Bulletin, Sep. 2006.

* cited by examiner

AUDITING QUERIES USING QUERY DIFFERENTIALS

BACKGROUND

Database systems are used today by organizations as the primary repository of the most valuable information that they maintain. As the volume of data stored in these repositories has increased, protecting the security of the data that is stored therein has attained increasing importance. Furthermore, the responsible management of sensitive data is mandated through laws such as the Sarbanes-Oxley Act, the United States Fair Information Practices Act, the European Union Privacy Directive and the Health Insurance Portability and Accountability Act (HIPAA).

One of the important components of the security infrastructure is an auditing system that can be used to aposteriori investigate potential security breaches related to a database system. These products monitor various operations such as user logins, queries, data updates and data definition language (DDL) statements to obtain an audit trail. The audit trail is analyzed offline either periodically or when needed to answer questions about access to schema objects such as: (1) failed login attempts, and (2) queries and corresponding users that accessed columns corresponding to PII (personal identifier information).

An important class of auditing is data auditing. A simple example of data auditing is auditing where the objective is to identify all queries and update statements that "accessed" a particular tuple, e.g., the PII of a specific individual. Such queries potentially reveal sensitive information.

It is not known whether any commercial database auditing systems actually support this functionality. However, it is known that single tuple auditing has been the subject of research. This research has proposed two fundamentally different semantic approaches which can be classified broadly as (data) instance dependent and (data) instance independent.

The instance independent approach has been shown to provide strong privacy guarantees. However, there are a limited range of query classes for which it can audit efficiently. Additionally, subsequent research has shown that the instance dependent approach suffers from severe privacy limitations.

It should be appreciated that real-world queries such as the transaction processing council ad-hoc (TPC-H) benchmark queries are often complex, using constructs like grouping, aggregation and correlated subqueries that can pose a risk to security. Thus, while it may be acceptable for an auditing system to consider a restricted class of audit expressions, an auditing system that considers a restricted class of queries is fundamentally incomplete. In addition, auditing systems without clearly defined privacy guarantees can encourage serious breaches of privacy. Consequently, the narrow application and privacy shortcomings of known approaches to single tuple data auditing significantly limit their real-world utility.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Conventional single tuple auditing approaches have limited real-world utility because of the limited range of query classes for which they can audit efficiently, and because of their significant privacy limitations. A query auditing methodology that addresses these shortcomings using query differentials is disclosed. However, the claimed embodiments are not limited to implementations that solve any or all of the aforementioned shortcomings. As a part of a disclosed embodiment a set of queries is identified and it is determined whether results of each query in the set of queries are different from results of respective differentials of each query in the set of queries. Based on the determination, a characterization of each query in the set of queries is made as one of safe and unsafe. Thereafter, access is provided to the characterization of each query in the set of queries. Because query differentials can be applied generally to the auditing of queries, a query auditing methodology is provided that has real-world utility as it relates to arbitrary and complex queries. Moreover, embodiments provide significant and well defined privacy assurances.

DRAWINGS

The accompanying drawings, which are incorporated in and form a part of this specification, illustrate embodiments and, together with the description, serve to explain the principles of the embodiments:

The drawings referred to in this description are for illustration only and should not be understood as being drawn to scale except if specifically noted.

DETAILED DESCRIPTION

Reference will now be made in detail to various embodiments, examples of which are illustrated in the accompanying drawings. While descriptions will be provided in conjunction with these embodiments, it will be understood that the descriptions are not intended to limit the scope of the embodiments. On the contrary, the disclosure is intended to cover alternatives, modifications and equivalents, of these embodiments. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 1:
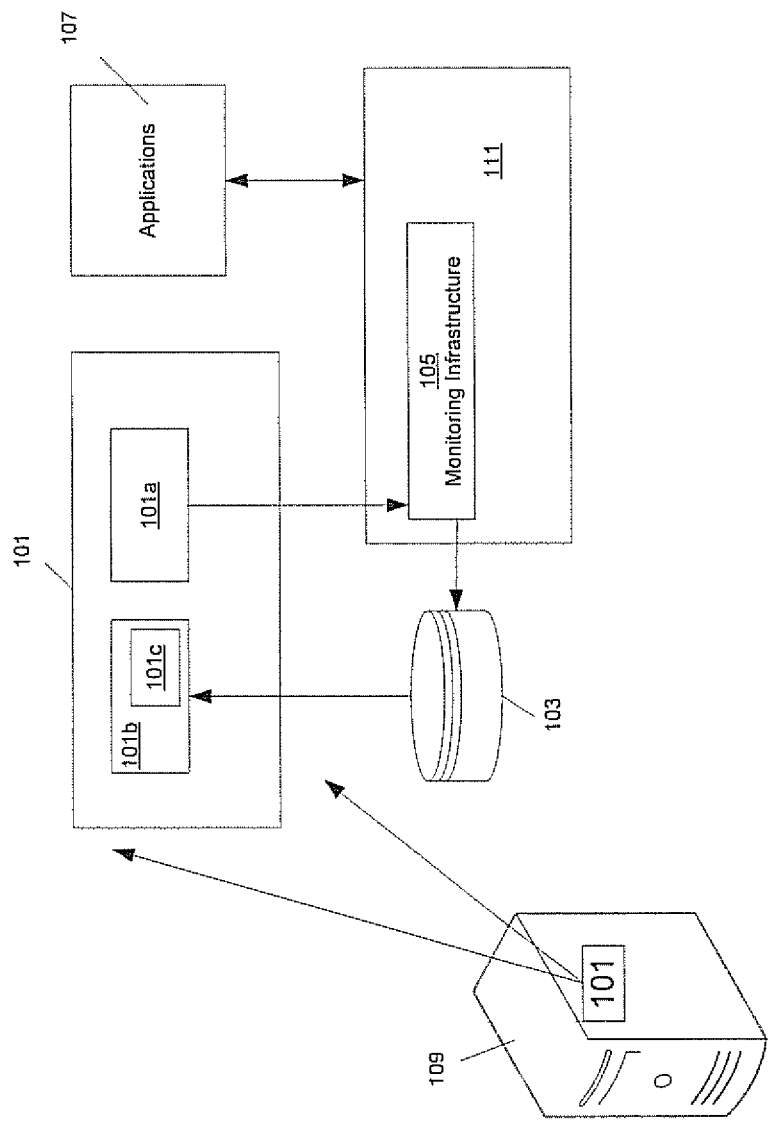
FIG. 1 shows an exemplary operational setting of a system for auditing using query differentials according to one embodiment.

Exemplary Operational Setting for a System for Auditing Queries Using Query Differentials According to One Embodiment FIG. 1 shows an exemplary operational setting 100 of a system 101c for auditing queries using query differentials according to one embodiment. In one embodiment, system 101c uses query differentials to determine whether arbitrary queries that are made to a database are "safe". In addition, system 101c includes components that operate to improve auditing efficiency without narrowing the classes of queries that can be audited. Moreover, in one embodiment, system 101c supports a substantial and clearly defined privacy guarantee. In the FIG. 1 embodiment, exemplary operational setting 100 includes auditing tool 101, audit log 103, monitoring infrastructure 105, application 107, computer system 109 and database 111.

In one embodiment, auditing tool 100 includes online auditing component 101a and offline auditing component 101b. Moreover, in one embodiment, system 101c can be a part of offline auditing component 101b. In other embodiments, system 101c can be separate from offline auditing component 101b but operate cooperatively therewith.

Referring to FIG. 1, online auditing component 101a logs query and update statements issued by applications 107 to database 111. In one embodiment, this information is logged as applications 107 run against database 111. In one embodiment, in addition to logging query and update statements, a corresponding user ID can be logged. In general, auditing component 101a logs auditing records which can include but are not limited to query and update statements, the timestamp of the operation and the user ID of the user that issued the operation.

Offline auditing component 101b uses audit log 103 to perform auditing. In one embodiment, auditing can be performed on both current and past database states. In one embodiment, auditing tool 100 can be used to reconstruct past database states. In one embodiment, this can be done by using a "point in time" recover application program interface (API) that allows auditing tool 100 to rewind the database state to previous states using the database transaction log (not shown).

Audit log 103 is a separate, secure database where the workload is logged. The workload is stored as a sequence of audit records, each of which contains information resulting from the execution of a query.

Monitoring infrastructure 105 is a part of database 111 and supports the logging of query and update statements by online auditing component 101a. In one embodiment, monitoring infrastructure 105 provides this information to audit log 103 as shown in FIG. 1.

Referring again to FIG. 1, in one embodiment, system 101c executes on computer system 109 as a part of auditing tool 101. In other embodiments, system 101c can be separate from auditing tool 101 but operate cooperatively therewith. In one embodiment, system 101c can audit arbitrary queries using query differentials that can include complex queries such as those that involve sub-queries. In one embodiment, system 101c examines each query in a query workload (a set of queries) by determining if the results of the query and its differential are the same. If the results of the query and it differential are determined to be the same, system 101c characterizes the query as "safe" and provides this characterization to auditing tool 101.

Operation

Figure 2A:
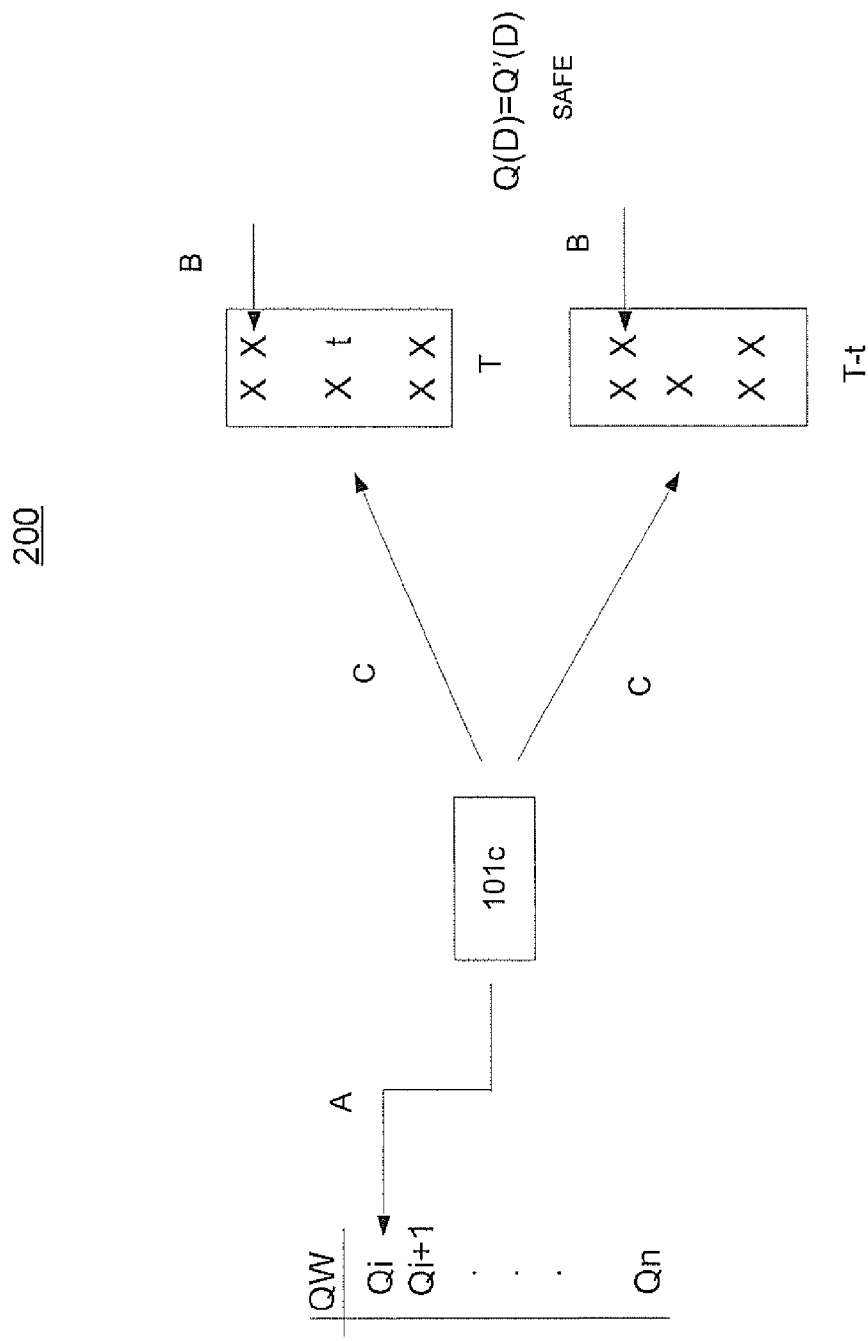
FIG. 2A illustrates the operation of a system for auditing queries using query differentials according to one embodiment.
Figure 2B:
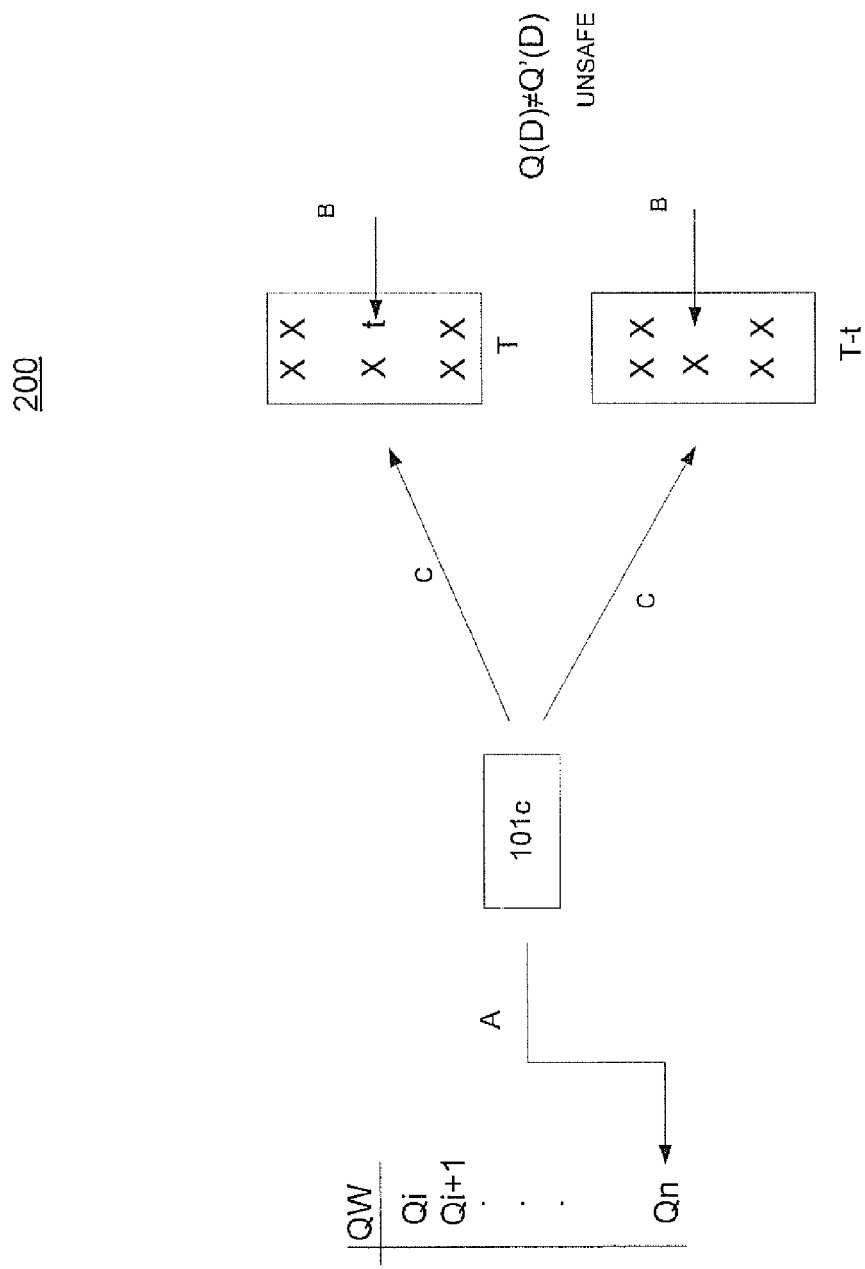
FIG. 2B illustrates the operation of a system for auditing queries using query differentials according to one embodiment.

FIGS. 2A and 2B illustrate the operation of a system 101c for auditing queries using query differentials. These operations are illustrated for purposes of clarity and brevity. However, it should be appreciated that other operations not shown in FIGS. 2A and 2B can be performed in accordance with one embodiment.

In one embodiment, system 101c uses query differentials $Q'(D)$ in single tuple auditing of queries $Q(D)$ made to a database D. In one embodiment, query differential $Q'(D)$ is a query of a database D where a tuple t is excluded from an accessed table T (e.g., table T-t). As used herein, tuple is intended to refer to sensitive information (e.g., personal identifier information etc.) whose access is closely monitored such as through the data auditing processes that are described herein. In one embodiment, a query Q is considered to "access" a tuple t in database D if $Q(D) \neq Q'(D)$. However, a query Q is said to be "safe" with respect to a tuple t if $Q(D)=Q'(D)$. This concept is illustrated in FIGS. 2A and 2B and discussed below.

Referring to FIG. 2A, at A, system 101c identifies a query $Q_i$ in query workload (QW) 201 for auditing. In one embodiment, query workload (QW) includes a set of queries $Q_i$–$Q_n$ that are to be audited. In the following example $Q_i(D)$ and $Q_i'(D)$ respectively represent a query $Q_i$ of a database D, and the differential $Q_i'$ of query $Q_i$ with respect to tuple t. Tuple t is sensitive information At B, system 101c directs the execution of the query $Q_i(D)$ and its differential $Q_i'(D)$. Because T and T-t contain the same data except for tuple t, the results from the execution of differential $Q_i'(D)$ should be the same as the results from the execution of query $Q_i(D)$, unless tuple t is accessed by $Q_i$. As is shown in FIG. 2A, the execution of differential $Q_i'(D)$ involves accessing data other than tuple t and thus gives the same results as does the execution of $Q_i(D)$. Consequently, the results generated from the execution of query $Q_i(D)$ and its differential $Q_i'(D)$ are the equivalent.

At C, system 101c compares the results of query $Q_i(D)$ and its differential $Q_i'(D)$ to determine if they are the equivalent. If the results of query $Q_i(D)$ and its differential $Q_i'(D)$ are equivalent, query $Q_i$ is characterized as safe.

FIG. 2B illustrates the use of a differential in an auditing operation that involves an outcome different from that illustrated in FIG. 2A. Referring to FIG. 2B, at A, system 101c identifies query $Q_n$ in query workload (QW) 201 for auditing.

At B, system 101c directs the execution of the query $Q_n(D)$ and its differential $Q_n'(D)$. As discussed above, because T and T-t contain the same data except for tuple t, the results from the execution of differential $Q_n'(D)$ should be the same as the results from the execution of query $Q_n(D)$ unless tuple t is accessed by $Q_n$. As is shown in FIG. 2B, the execution of differential $Q_n'(D)$ involves an attempt to access missing tuple t (which is absent from table T-t). Thus, its results reflect an absence of tuple t not reflected in the results of the execution of $Q_n(D)$. Consequently, the results generated from the execution of query $Q_n(D)$ and its differential $Q_n'(D)$ are not equivalent.

At C, system 101c compares the results of the execution of query $Q_n(D)$ and its differential $Q_n'(D)$ to determine if they are the equivalent. Because the results of the execution of query $Q_n(D)$ and its differential $Q_n'(D)$ are not equivalent, query $Q_n$ is characterized as being unsafe.

Additional aspects of the operation of system 101c are described in the following section with reference to particular examples. These aspects of the operation of system 101c include additional details related to the application of query differentials. Moreover, efficiency maximization operations, which in one embodiment involves a rule based framework, are described. In addition, the privacy assurances that are provided by system 101c are discussed.

Query Differentials

In one embodiment, system 101c uses query differentials to audit arbitrary queries (not limited to a class). In one embodiment, such queries can include structured query language (SQL) queries that can include but are not limited to constructs such as grouping, aggregation and correlated subqueries.

In one embodiment, system 101c uses a differential Q'(D) in the performance of instance dependent single tuple auditing. In other embodiments system 101c can use differentials in other types of single tuple auditing.

The following example shows how system 101c determines whether a query accesses a specific tuple t. Consider the following query Q1:

select*from customer where c_custkey=100 which requests details associated with customer with id 100. In response, system 101c accesses the query and determines if there is an instance of a database with customer id 100 where eliminating t makes the query result empty. In this case because system 101c can straightforwardly determine that Q(D)≠Q'(D) for the query Q1, the customer tuple t with id 100 can be determined to be accessed by the query Q1.

In one embodiment, a tuple t may not be accessed but can be considered to be "critical". Consider the query Q2:

select o_custkey, count(*)
from orders
group by o_custkey
having count(*)>=10 that determines the number of orders placed by customers that have made at least 10 orders. In one embodiment, where the customer with id 100 has placed only 5 (<10) orders that correspond respectively to tuples $\{o_1, \ldots, o_5\}$ in the orders table, the output of query Q2 on the current database would not have an entry corresponding to the customer with id 100. Accordingly, because a deletion of any of the customer's orders would not change the output of Q2, system 101c can determine that none of the tuples $\{o_1, \ldots, o_5\}$ in the aforementioned orders table is accessed by Q2.

However, because an instance of the database D can be identified where customer with id 100 has 10 orders including $o_1$, and that in such instance a deletion of $o_1$ would change the output of query Q2, each of the tuples in $\{o_1, \ldots, o_5\}$ is critical. In some conventional instance independent approaches criticality is a central semantic of the auditing system. However, notions of criticality have been shown to be ineffective as it regards queries that contain subqueries (determining if a tuple is critical to a query that contains subqueries has been shown to be undecidable). In contrast, as discussed herein, differentials can be used with queries that include subqueries.

Privacy Assurances

Privacy assurances are important as it relates to data auditing as they indicate risk of breach that exists with regard to queries. Some queries can be problematic. Consider a query Q that finds the subset of tuples satisfying a predicate P in a table T. Suppose an adversary is aware that a tuple t exists in the database. If the output of query Q does not include the tuple t, the adversary can infer that tuple t does not satisfy the predicate P.

The following example illustrates how a privacy breach can be implied by instance dependent semantics. Consider the case where the customer table in a database has a credit rating attribute and that in the current instance of the database, customer John Doe has a credit rating of 700. Moreover, consider the following two queries, Q3:

select sum(CreditRating −700) from customer and Q4:

select sum(CreditRating−700) from customer where c_custname<>'John Doe'

It should be appreciated that by determining if the results of the two queries are equal, an attacker can learn that John Doe's credit rating is 700. However, the tuple corresponding to John Doe is not accessed by either Q3 or Q4.

The "attack" presented in this example involves knowing the credit rating of customer John Doe apriori. However, if the credit rating of John Doe is changed to 600, query Q3 would access the corresponding tuple and would be flagged as unsafe. Thus, if an attacker does not know the value of John Doe's credit rating upfront, then by issuing queries Q3 and Q4, the attacker is taking a risk of being detected by the audit system (e.g., via system 101c). Accordingly, as regards exemplary embodiments, no attack is risk free with respect to the single tuple auditing semantics described herein.

Efficiency Maximization

Consider a single tuple t in a table T that is desired to be examined to determine whether it has been accessed by a self-join-free query Q. The substitution technique creates a new query Q' from Q by substituting table T with a table T' which contains the single tuple t. This is accomplished by adding a suitable predicate to Q. Given these conditions, determining whether Q accessed t is equivalent to determining if the output of Q' is empty. The following example illustrates this technique. Consider the following query Q5:

select*from orders where o_orderdate>'1998-01-01'

In this example, it is assumed that the tuple of interest is a specific order, o_orderkey=5000, of a particular customer that is sensitive, e.g., because it was an order of sensitive pharmaceuticals. Using a substitution technique it can be determined if the output of the following query Q6 is empty:

select*from orders where o_orderdate>'1998-01-01' and o_orderkey=5000

In one embodiment, this determination can be efficiently implemented by placing an index on the o_orderkey column. In one embodiment, system 101c can determine if the modified query Q6 is empty without executing it, for example, by determining if Q6 contains the predicate o_orderkey<3000 and o_orderkey=5000 is sought. In one embodiment, this methodology can be extended to handle grouping and aggregation features. Moreover, this methodology can be used to compute a query differential with respect to a forbidden view using query rewriting (see discussion below).

Rule Based Framework for Efficiency Maximization

In one embodiment, the herein discussed methodology is extensible to query languages such as structured query language (SQL) and enables the auditing of queries without query execution.

Consider the following workload of two queries Q7 and Q8:
    select*from orders
    where o_orderdate>'1997-01-01'
    select*from orders
    where o_orderdate>'1998-01-01'

It is assumed for this example that the tuple of interest is a specific order tuple t. Moreover, it is assumed that the first query has been verified as safe. Because the second query is subsumed by the first, system 101c can determine that the second query is also safe without having to execute it. This example illustrates how the result of auditing one query can be used to audit future queries.

In one embodiment, the herein disclosed rule based framework is used to capture these types of efficiency maximizing operations. For example, in one embodiment, if a query Q does not access a tuple t, then the query Q is equal to its differential on the current database instance. The aforementioned, rules can be termed "instance equivalence rules." In one embodiment, these instance equivalence rules can be represented using the algebraic representation of a query in the form of a logical plan. As used herein the term instance equivalence rule is intended to refer to an ordered pair of logical plans, with a left-hand side (LHS) portion and a right-hand side (RHS) portion whose results are equal on the current database instance. In one embodiment, the instance equivalence rules can be leveraged for data auditing where previously audited queries provide a source from which to derive the rules.

Logical Representation of Rules

Figure 3:
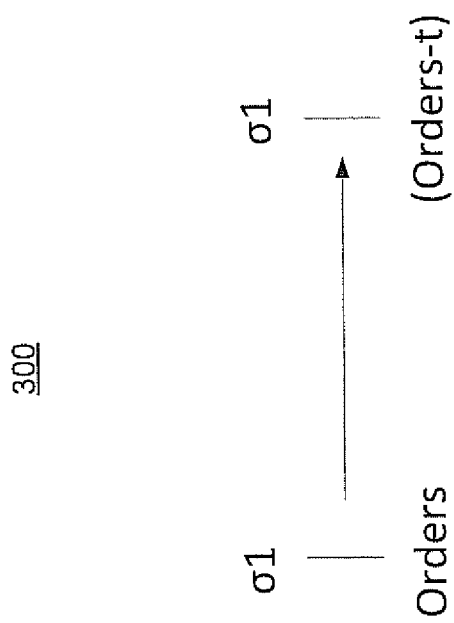
FIG. 3 shows a logical representation of an instance equivalent rule that is based on a query according to one embodiment.

FIG. 3 shows a logical representation of an instance equivalent rule 300 that is based on query Q7 discussed above according to one embodiment. As discussed above, Query Q7 computes the order tuples t that have a total price that is greater than the average. Query Q7 was shown to be safe with respect to tuple t. Instance equivalent rule 300 shows that the selection predicate (denoted by a1) on the original table produces the same result as its differential (note that the table in the RHS of the rule is Orders-t).

In one embodiment, both standard transformation rules (such as are used in an query optimizer) and instance equivalence rules on a current instance of a database can be used. In one embodiment, for a given query, rules are used in an attempt to "reach" its differential. If successful, it is determined that the query and its differential are equal on the current database instance without having to perform a query execution. However, if unsuccessful a query execution can be performed.

Figure 4:
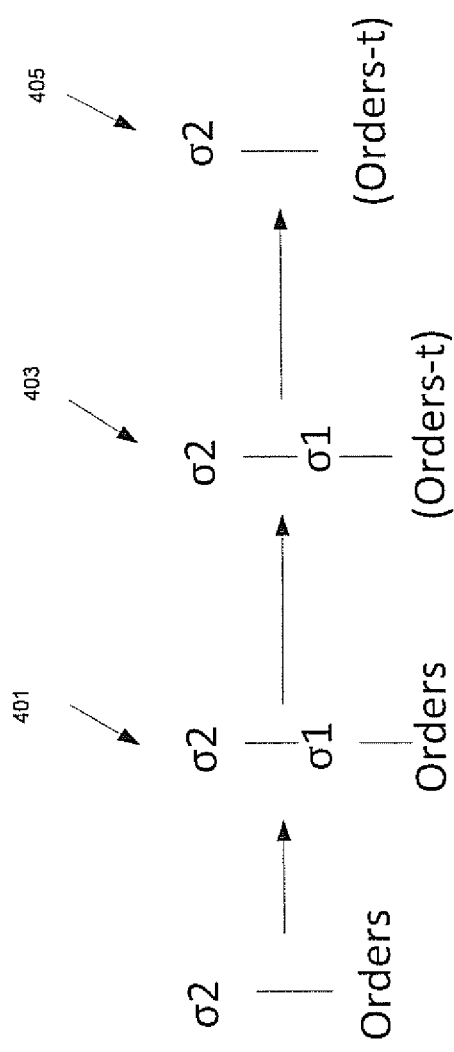
FIG. 4 shows how equality of a query and its differential for a select query is inferred according to one embodiment.

FIG. 4 shows how equality of a query and its differential for a select query is inferred according to one embodiment. As regards Q8, discussed above, using the instance equivalence rule in FIG. 3, the logical plan of its differential can be reached by starting from the logical plan corresponding to the second query. The sequence of transformations are shown in FIG. 4. The selection predicate for the second query is denoted by σ1. Referring to FIG. 4, the individual steps of the derivation are: (1) rewrite the original plan as a predicate on the LHS of the instance equivalence rule 401, (2) replace the LHS of the instance equivalence rule with the RHS 403, and (3) collapse the predicates by using a rule that eliminates redundant selection predicates to obtain the target differential plan 405. More specifically, the LHS of the rule is matched with equivalents until a form is reached that allows elimination of redundant portions to produce the target differential plan, or RHS of the rule.

In one embodiment, the framework discussed above can manage complex queries (e.g., SQL) by using appropriate transformation and instance equivalence rules. The LHS is treated as a pattern and matched. Alternately, any part of the plan under consideration that is subsumed by the LHS can be identified. For subsumption, view matching logic can be used. For example, with regard to the instance equivalence rule transformations discussed with reference to FIG. 4, the first step involves a rewrite based on view matching. In one embodiment, complex views can be matched.

Figure 5:
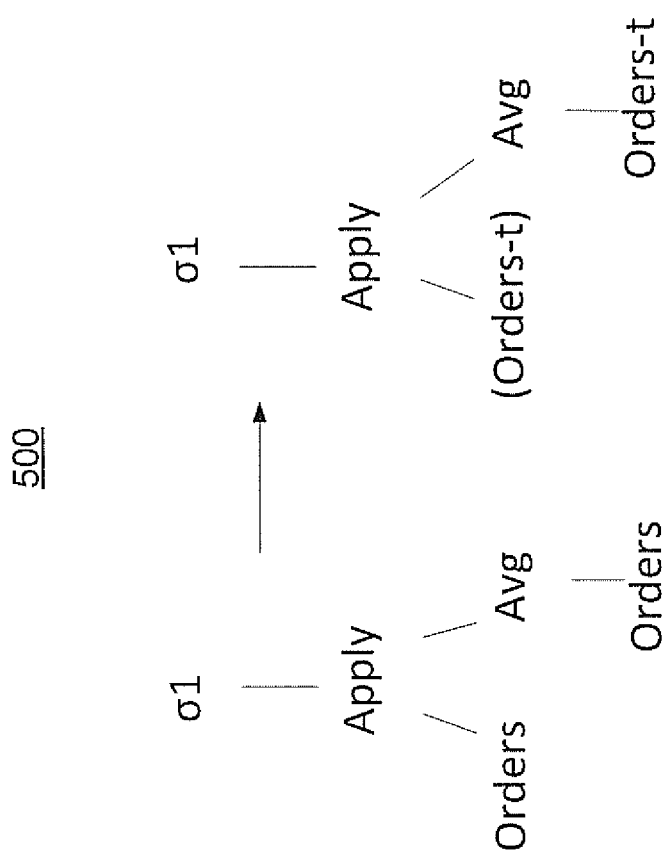
FIG. 5 illustrates an instance equivalence rule for a query that includes a nested subquery according to one embodiment.

FIG. 5 illustrates an instance equivalence rule 500 for a query that includes a nested subquery according to one embodiment. Its application is discussed below. Consider the following two queries Q9 and Q10 that are similar to queries of the previous example but that include a nested subquery:
    select*from orders
    where o_orderdate>'1997-01-01'
    and o_totalprice>
    select (avg(o_totalprice) from orders)
    select*from orders
    where o_orderdate>'1998-01-01'
    and o_totalprice>
    select (avg(o_totalprice) from orders)

Figure 6:
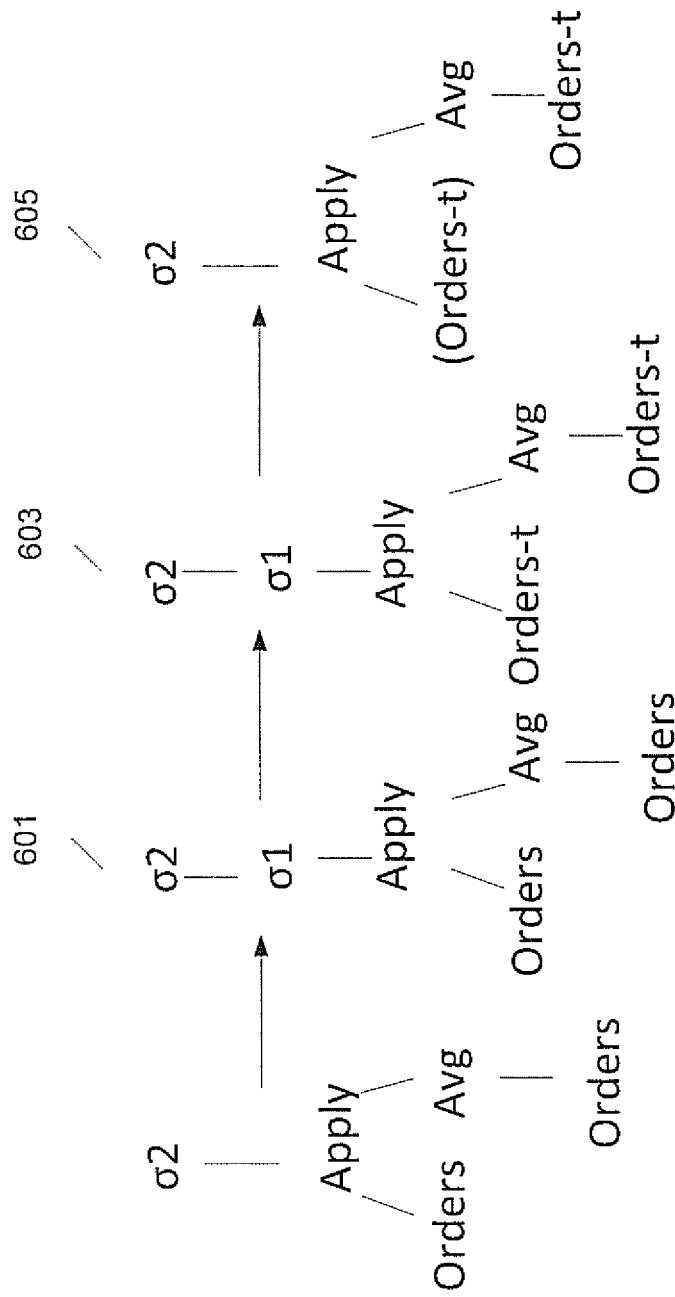
FIG. 6 illustrates the manner in which equality of a query and its differential for a nested subquery is inferred according to one embodiment.

Let the tuple of interest t be a specific order tuple and the first query be safe. The LHS of the rule uses an Apply operator to represent the subquery. The Apply operator is normalized by pulling the selection above the operator (the selection above the Apply is identified with the Apply.) As in the previous example, the equality of the second query and its differential can be established as is shown in FIG. 6 and described below. It should be appreciated that the first step leverages a more sophisticated form of view matching than is used in the FIG. 4 example. In one embodiment, an Apply operator is considered to be subsumed by another if its parent selection is subsumed and its children are identical. Other portions of the derivation are similar to the derivation discussed with reference to FIG. 4 above.

FIG. 6 illustrates the manner in which equality of a query and its differential for a nested subquery as shown in FIG. 5 is inferred according to one embodiment. Referring to FIG. 6 the individual steps of the derivation are: (1) rewrite the original plan as a predicate on the LHS of the instance equivalence rule 601, (2) replace the LHS of the instance equivalence rule with the RHS 603, and (3) collapse the predicates by using a rule that eliminates redundant selection predicates to obtain the target differential plan 605.

Figure 7:
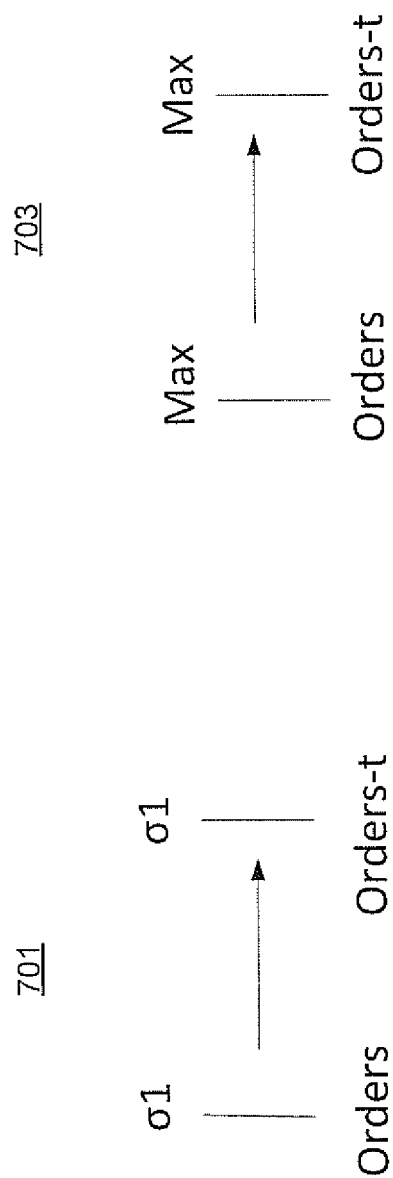
FIG. 7 shows instance equivalence rules obtained from previous executions according to one embodiment.
Figure 8:
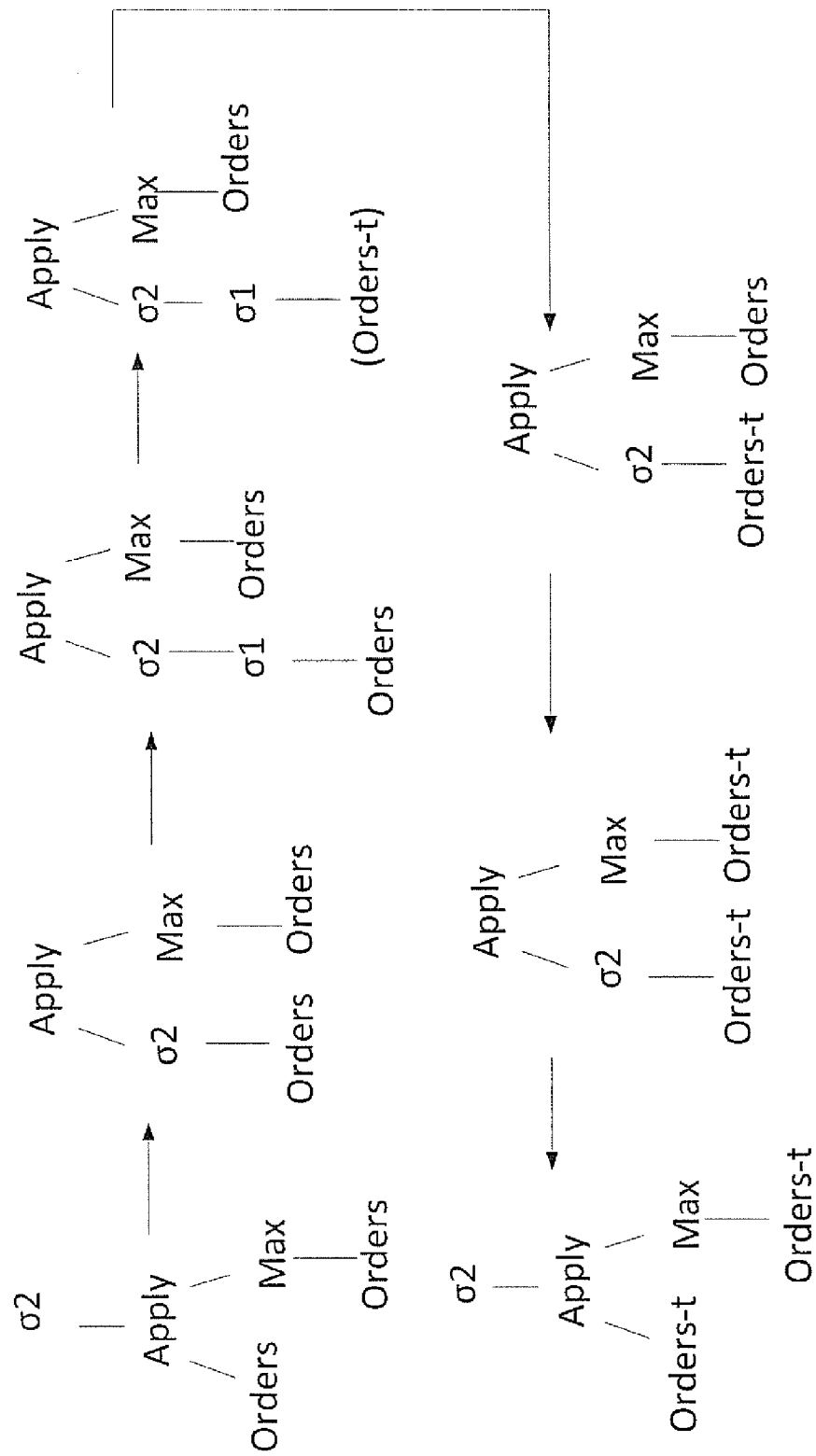
FIG. 8 shows the manner in which equality is inferred using multiple instance equivalence rules according to one embodiment.

FIG. 7 shows instance equivalence rules obtained from previous executions according to one embodiment. Referring to FIG. 7, two instance equivalence rules 701 and 703 are shown. Rule 703 involves the max aggregation and corresponds to the tuple of interest not having the maximum value in the Orders table. In one embodiment, the above two rules can be leveraged to determine the safeness of a complex query that includes a nested subquery such as is shown in FIG. 8. FIG. 8 shows the manner in which equality is inferred using multiple instance equivalence rules according to one embodiment. In the FIG. 8 embodiment, the normalized form of the Apply operator is eschewed and the selection is pushed down in the plan configuration. It is noted that both the left and right children of the Apply operator are subsumed by the LHS of some instance equivalence rule. Applying both the rules yields the target plan of the differential query.

Reordering Queries

In one embodiment, an efficiency maximization process that involves the reordering of the queries of a workload in order to further improve efficiency can be utilized as is shown in the following example. Consider a workload of three queries Q11, Q12 and Q13 presented in the following order:

```
select*from orders
where o_orderdate>'1997-01-01'
and o_totalprice>
select (avg(o_totalprice) from orders)
select*from orders
where o_orderdate>'1998-01-01'
and o_totalprice>
select (avg(o_totalprice) from orders)
select*from orders
where o_orderdate>'1996-01-01'
and o_totalprice>
select (avg(o_totalprice) from orders
```

As discussed above, instance equivalence rules can be used to avoid query execution for the second query. However, the third query should be executed as it is not subsumed by any of the previous queries. Thus, the execution corresponding to the second query can be saved. However, suppose that the queries in the workload are reordered so that the third query is audited first. If the third query is safe, we can then infer the same for both the remaining queries thus saving two query executions.

Reordering as used herein is intended to refer to the following process: given a query-only workload, finding the permutation of the sequence of the queries that leads to the minimal number of executions for single tuple auditing. This problem can be solved by creating a subsumption graph which is a directed acyclic graph (DAG) in which there is one node corresponding to each query in the workload and there is an edge from a node Q1 to a node Q2 if the logical plan of Q2 is subsumed by the logical plan of Q1. The queries are arranged in the order yielded by a topological sort of the subsumption graph.

Audit Expressions

In one embodiment, single tuple auditing can be extended to more general audit expressions. In one embodiment, audit expressions can be expressed as forbidden views. In one embodiment, the forbidden views can be expressed as a predicate over a single table. If the predicate is of the form id=value, then there is a reduction to single tuple auditing. Consider the following view over the Patients (patientID, disease) table in a health care database.

```
select*from Patients where disease='cancer'
```

The above view reflects the idea that information about cancer patients is considered sensitive. In addition, in one embodiment, a limited class of joins is supported as forbidden views. In one embodiment, extending forbidden views to joins enables the expression of simple predicates on set-valued attributes. For example, an extension of the above example would be where the database has the information about patients in a table called Patients but the diseases stored in a separate table Diseases to account for the fact that a patient might suffer from multiple diseases over time.

A patient can be thought of as consisting of a set valued attribute containing each of the diseases they have suffered from over time. More formally, in one embodiment the following class of forbidden views is allowed:

```
select*from universal-table
where condition list
```

The term "universal table" above refers to the join of a set of tables where a key table (e.g., Patients) is utilized that intuitively captures the atomic attributes in the set, and joins other tables (e.g., Diseases) through foreign key lookups that add the set-valued attributes. The "condition list" consists of simple predicates that do not involve subqueries. This is illustrated by following example. Consider again the Patients-Diseases example discussed above, from which can be written the following view:

```
select*
from Patients P join Diseases D on patient ID
where P.zipcode='53702'
and D.disease='cancer'
``` to capture our desire to hide information about cancer patients in the zip code 53702.

In one embodiment, the forbidden views cover most of the examples previously considered. In one embodiment, the disclosed auditing semantics can be extended to cover the above class of forbidden views. As noted above, the forbidden view can be considered to express a boolean predicate on a tuple containing a set-valued attribute. For single tuple auditing, a query is rewritten to exclude the tuple. Given a forbidden view, similarly the query can be rewritten to exclude any tuples in the "universal" table that belong to the forbidden view. The rewritten query is called its differential with respect to the forbidden view. A query is deemed to be safe with respect to the forbidden view if it has the same result as its differential on the current instance of the database. This is illustrated in the following example. Continuing the above discussed forbidden view example, consider the query Q14:

```
select*from Patients where patientID='Alice'
```

The differential of Q14 is:

```
select*from Patients P where patientID='Alice'
and not (zipcode='53702' and
exists (select*from Disease D
where P.patientID=D.patientID
and D.disease='cancer'))
```

If Alice happens to live in the zipcode 53702 and suffered from cancer, then the differential would produce a different result. Otherwise, Q14 would be deemed safe with respect to the forbidden view.

Figure 9:
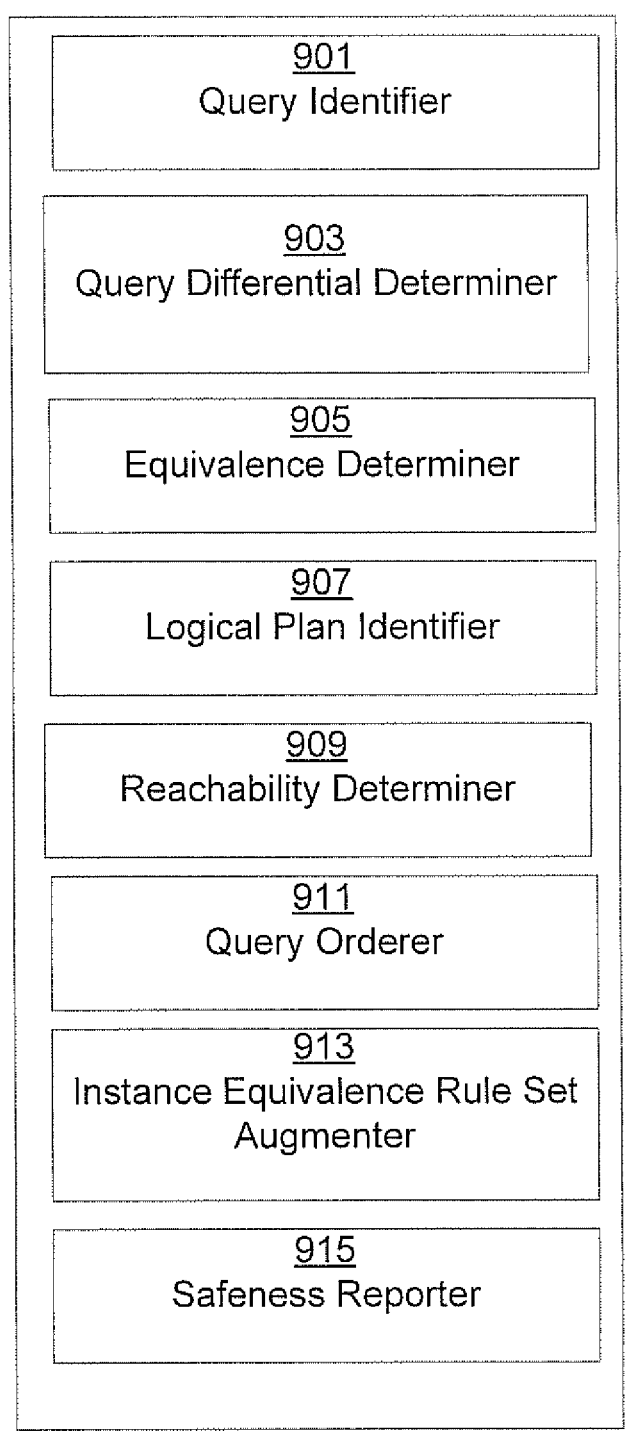
FIG. 9 shows components of a system for auditing queries using query differentials according to one embodiment.

Components of system for Auditing Queries Using Query Differentials According to One Embodiment FIG. 9 shows components of a system 101c for auditing queries using query differentials according to one embodiment. In one embodiment, components of system 101c implement an algorithm for auditing queries using query differentials. In the FIG. 9 embodiment, components of system 101c include query identifier 901, query differential determiner 903, equivalence determiner 905, logical plan identifier 907, reachability determiner 909, query orderer 911, instance equivalence rule set augmenter 913 and safeness reporter 915.

Referring to FIG. 9, query identifier 901 identifies queries that are a part of a workload of query statements. In one embodiment the queries can include corresponding user ids among other associated data.

Query differential determiner 903 determines query differentials for queries that are a part of a workload of query statements. In one embodiment, query differential determiner 903 generates a differential by a rewriting a query Q to exclude a tuple t from a table T in a database D, or tuples t that belong to a forbidden view.

Equivalence determiner 905 determines whether the results of a query and a query differential are the same. In one embodiment, the query and its differential are examined by executing both. Equivalence determiner 905 determines if the results of each query of the set of queries is different from the results of its differential with respect to a tuple. In one embodiment, if equivalence determiner 905 determines that the results of a query and its differential are equal, the query is characterized as safe. However, if the results of a query and its differential are not equal the query is characterized as unsafe.

Logical plan identifier 907 identifies the logical plans for each query in the workload of query statements and for its differential. Logical plan identifier 907 can identify plans for queries that include but are not limited to complex SQL queries.

Reachability determiner 909 determines if the query differential plan of a query differential is reachable from the query plan of the corresponding query. In one embodiment reachability determiner 909 uses instance equivalence rules to determine if a query differential plan of a query differential is reachable from the query plan of the corresponding query. If it is determined that a query differential plan of a query differential is reachable from the query plan of the corresponding query, then coincidentally it is determined that the query and its differential are equal.

Query orderer 911 reorders queries when such reordering enables query results to be determined without execution. In one embodiment, queries that are reordered can include but are not limited to queries that are subsumed by other queries.

Instance equivalence rule set augmenter 913 augments the current set of instance equivalence rules with new instance equivalence rules. In one embodiment, the instance equivalence rule set augmenter 913 augments the set of equivalence rules where the results of a query and its differential are equal but no equivalence rule exists in the set of equivalence rules that enables a differential plan of the query differential to be reached from a query plan of the corresponding query.

Query safeness reporter 915 provides access to a safeness characterization of audited queries that are a part of the workload of queries. In one embodiment, the safeness characterization can be reported to an auditing tool or system.

It should be appreciated that the aforementioned components of system 101c can be implemented in hardware or software or in a combination of both. In one embodiment, components and operations of system 101c can be encompassed by components and operations of one or more computer programs (e.g., auditing tool 101 in FIG. 1). In another embodiment, components and operations of system 101c can be separate from the aforementioned one or more computer programs but can operate cooperatively with components and operations thereof.

Figure 10:
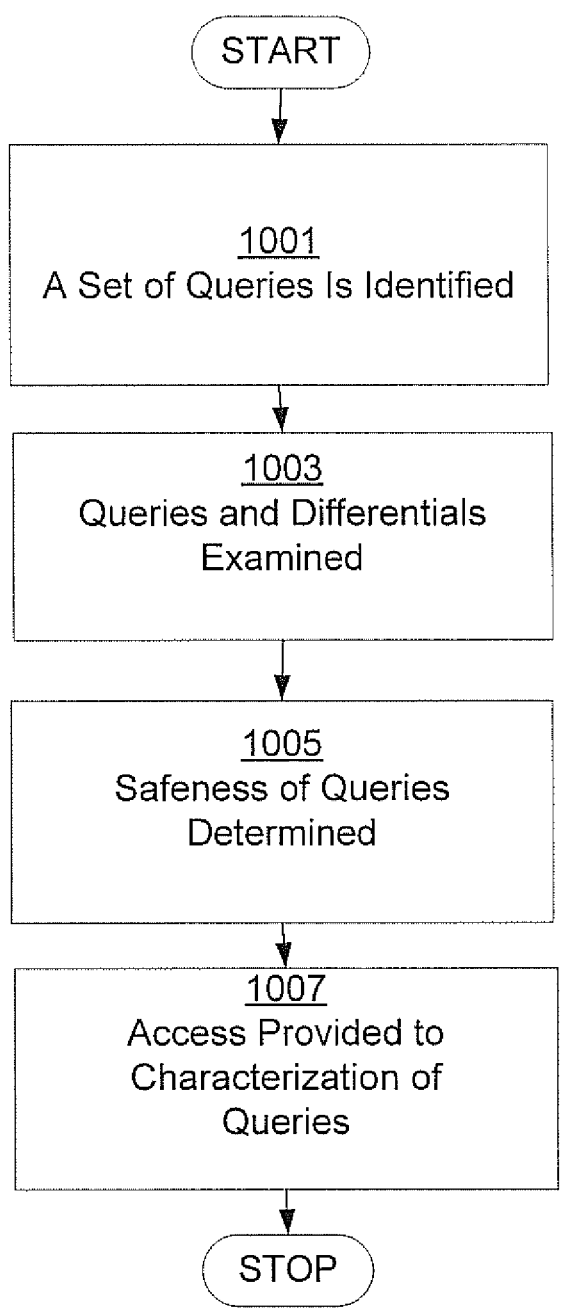
FIG. 10 shows a flowchart of a method for auditing queries using query differentials according to one embodiment.
Figure 11:
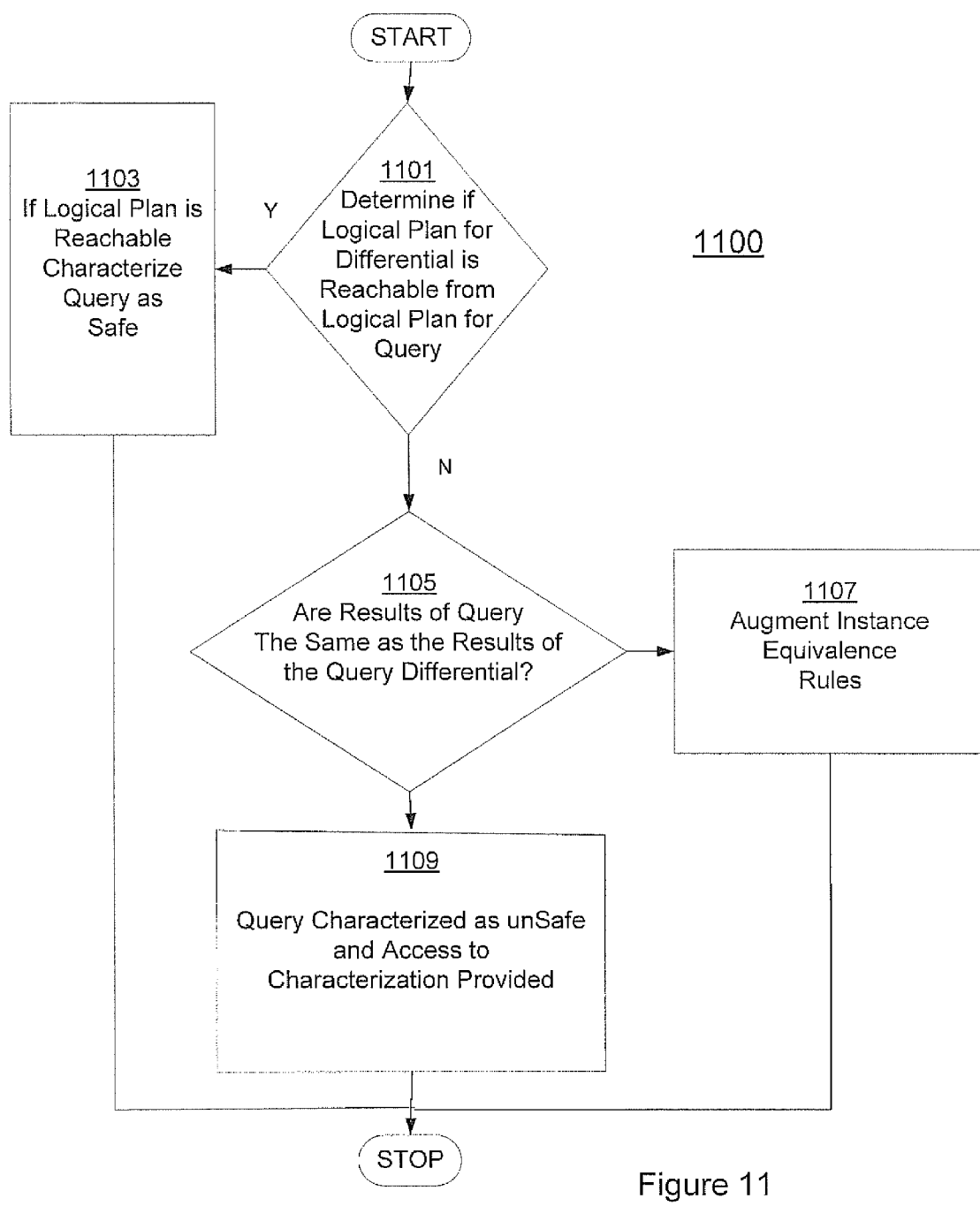
FIG. 11 shows a flowchart of a method for auditing queries using query differentials according to one embodiment.
Figure 12:
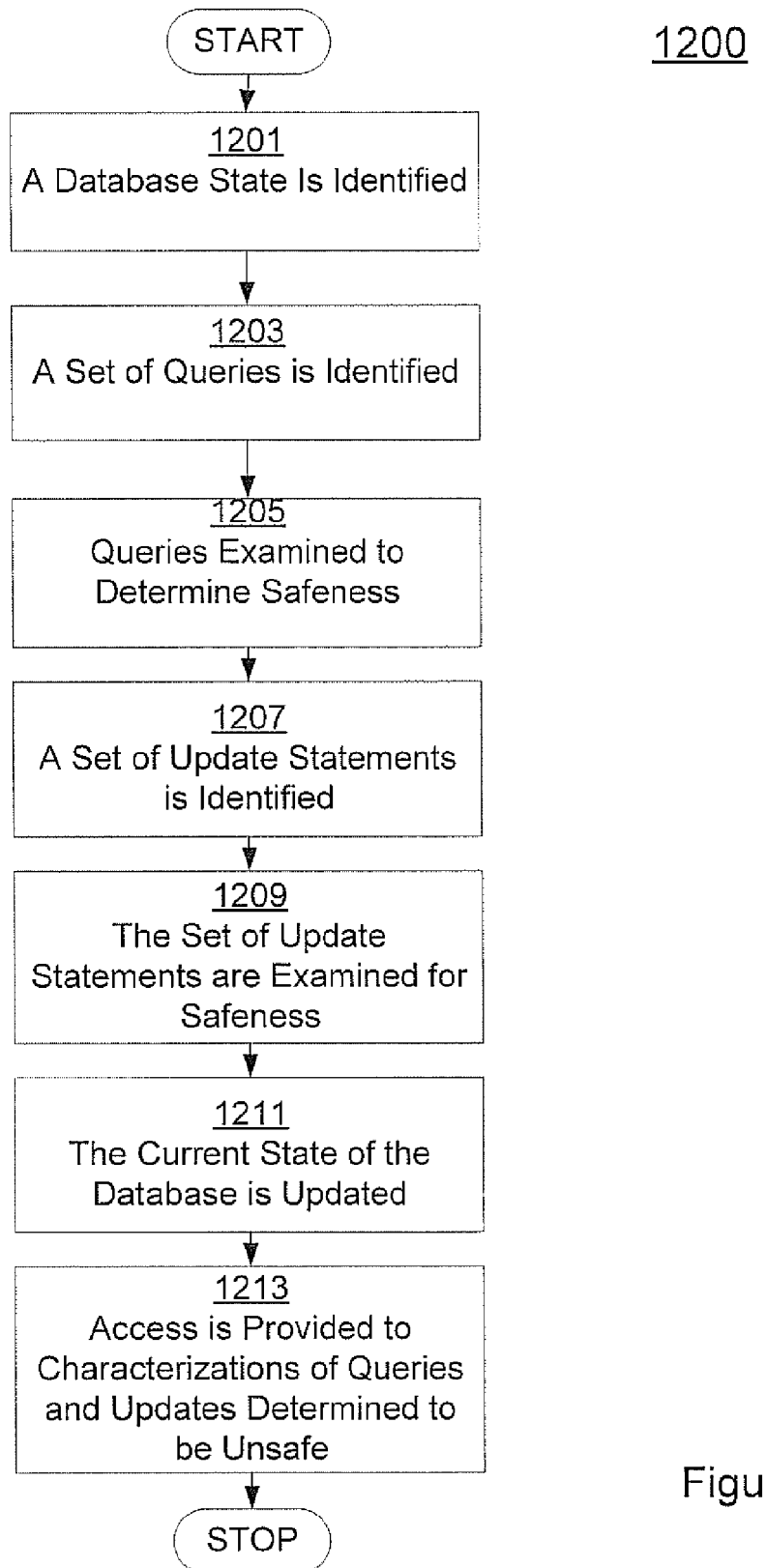
FIG. 12 shows a flowchart of a method for auditing queries using query differentials according to one embodiment.

Methods for Auditing Queries Using Query Differentials According to One Embodiment FIGS. 10, 11 and 12 show flowcharts 1000, 1100 and 1200 of methods for auditing queries using query differentials according to embodiments. The flowcharts include processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart. Within various embodiments, it should be appreciated that the steps of the flowcharts can be performed by software, by hardware or by a combination of both.

Referring to FIG. 10, at 1001 a set of queries is identified. In one embodiment the set of queries can be a part of a query workload. In one embodiment, the query workload includes a set of query statements with corresponding user IDs, the current state of the database, and a tuple.

At 1003, each of the queries in the set of queries and their differentials are examined. In one embodiment, the queries and their differentials are examined by executing both. In one embodiment, it is determined whether results of any query, of the set of queries, are different from results of its respective differential.

At 1005, the safeness of the queries are determined based on the examination of the queries and their differentials. In one embodiment, if results of a query and its differential are equal, the query is characterized as being safe. However, if results of a query and its differential are not equal the query is characterized as being unsafe.

At 1007, access is provided to the characterization of the safety of the query. In one embodiment, this information can be reported to a query auditing tool or system.

In the FIG. 11 embodiment, logical plans are used to facilitate efficient auditing by enabling safeness to be determined without having to execute a query. Referring to FIG. 11, at 1101 it is determined whether a logical plan for a differential of a query is determinable (e.g., reachable) from a logical plan for the query. In one embodiment, the determination involves ascertaining whether the logical plan for the differential can be reached using an equivalence rule that is a part of a current set of equivalence rules.

At 1103, if a logical plan for a differential of the query is found to be determinable (e.g., reachable) from the logical plan for the query, the query is characterized as safe.

At 1105, if a logical plan for a differential of the query cannot be determined from the logical plan for the query, it is determined whether the results of the query are the same as its respective differential with respect to a tuple. This process is described in detail herein (see FIGS. 2A-8 and accompanying discussions).

At 1107, if the results of the query are the same as the results of its differential (and an equivalence rule for the query and its differential is not identified), the set of equivalence rules corresponding to the workload with which the query is associated is augmented with a new rule that equates a logical plan for the query and a logical plan for the differential of the query.

At 1109, if the results of the query are different from the results of its differential, the query is characterized as unsafe and access to this characterization of the query is provided. In one embodiment, the characterization can be reported to a query auditing system.

In FIG. 12, a flowchart of an overarching method for auditing queries using query differentials is shown according to one embodiment. Referring to FIG. 12, at 1201, a database state is identified. In one embodiment, a database log is used to rewind the database to a desired state for auditing.

At 1203, a set of queries is identified. In one embodiment, the set of queries is identified from query/update statements with corresponding user IDs. In one embodiment, the set of queries can be identified from audit expressions.

At 1205, the queries are examined to determine their safeness. In one embodiment, the sequence of the examination of the queries proceeds according to the sequence order of the queries in the query workload.

At 1207, a set of update statements is identified. At 1209, the set of update statements are examined to determine if they are safe. In one embodiment, the update statements are examined for safeness using the same processes used to determine query safeness. At 1211, the current state of the database is updated. And, at 1213, access is provided to the characterizations of queries and updates that are determined to be unsafe.

Shown below in Tables 1-3 are exemplary query auditing algorithms according to one embodiment.

TABLE 1

Overall Auditing Algorithm

Input: Workload W of query/update statements with corresponding user ids; Audit Expression AE
Output: Subset of W that is unsafe
1: Use the database log to rewind to the appropriate state of the database
2: Split W into query-only workloads with alternating updates
3: Proceed in the same sequence as W
4: For each query-only workload QW
5: Call QUERYAUDIT(QW, AE) to find all queries in QW that are unsafe
6: For each update statement U
7: Call UPDATEAUDIT(U) to check if U is unsafe
8: Update the current state of the database
9: Return all queries and updates that are unsafe along with corresponding user ids

TABLE 2

Baseline Query Auditing Algorithm

Input: (1) Query Workload QW of query statements with corresponding user ids, (2) Current state of database D, (3) Tuple t
Output: Subset of QW that is unsafe
1: For each query Q 2 QW
2: Check if Q(D) and Q0t(D) are equal by executing both
3: If (not equal)
4: Report that Q is unsafe

TABLE 3

Efficiency Maximize Algorithm

Figure 13:
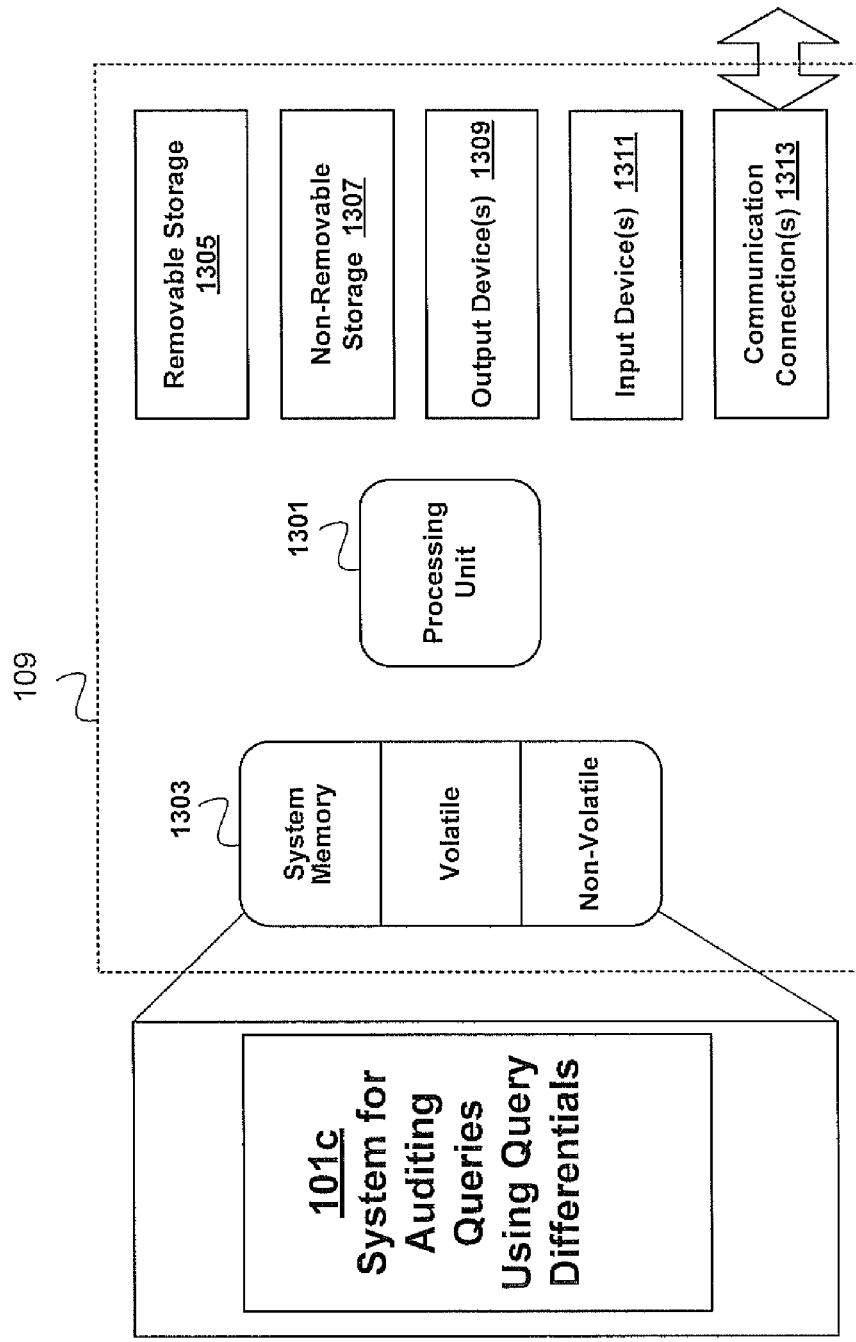
FIG. 13 shows an exemplary computer system according to one embodiment.

Input: Query-only Workload QW of query statements with corresponding user ids; Tuple t in table T
Output: Subset of QW that is unsafe
1: Let D be the database state corresponding to QW
2: Let I be the set of instance equivalence rules
3: For each query Q ∈ QW
4: Let P and P0 denote the logical plans for Q(D) and $Q'_t(D)$
5: Check if P0 is reachable from P using I
6: If not, Check if Q(D) and $Q'_t(D)$ are equal
7: If (equal) augment I with a new instance equivalence rule
8: If (not equal)
9: Report that q is unsafe Exemplary Hardware According to One Embodiment FIG. 13 shows an exemplary computer system 109 according to one embodiment. Computer system 109 typically includes at least some form of computer readable media. Computer readable media can be any available media that can be accessed by computer system 109 and can include but is not limited to computer storage media.

In its most basic configuration, computer system 109 typically includes processing unit 1301 and memory 1303. Depending on the exact configuration and type of computer system 1303 that is used, memory 1303 can be volatile (such as RAM) 1303a, non-volatile 1303b (such as ROM, flash memory, etc.) or some combination of the two. In one embodiment, system 101c can reside in memory 1303 as is shown in FIG. 13.

Additionally, computer system 109 can include mass storage systems (removable 1305 and/or non-removable 1307) such as magnetic or optical disks or tape. Similarly, computing device 1300 can include input devices 1311 and/or output devices 1309 (e.g., such as a display). Additionally, computer system 109 can include network connections 1313 to other devices, computers, networks, servers, etc. using either wired or wireless media. As all of these devices are well known in the art, they need not be discussed in detail.

With reference to exemplary embodiments thereof methods and systems for auditing queries using query differentials are disclosed. A method includes identifying a set of queries, determining if results of each query of the set of queries are different from results of respective differentials of each query of the set of queries, and based on the determining, making a characterization of each query of the set of queries as one of safe and unsafe. Access is provided to the characterization of each query of the set of queries.

The foregoing descriptions of specific embodiments have been presented for purposes of illustration and description. They are not intended to be exhaustive or to limit the embodiments to the precise forms disclosed, and obviously many modifications and variations are possible in light of the above teaching. The embodiments were chosen and described in order to best explain their principles and practical application, to thereby enable others skilled in the art to best utilize various embodiments with various modifications as are suited to the particular use contemplated. It is intended that the scope of the embodiments be defined by the Claims appended hereto and their equivalents.

Although the subject matter has been described in language specific to structural features and/or methodological acts, it is to be understood that the subject matter defined in the appended claims is not necessarily limited to the specific features and acts described above. Rather, the specific features and acts described above are disclosed as example forms of implementing the Claims.

What is claimed is:

1. A method performed by at least one computing system, the method comprising:
   identifying a query;
   executing the query a first time on data comprising a sensitive tuple and other tuples to thereby obtain a first result;
   executing the query a second time on different data comprising the other tuples but not the sensitive tuple to thereby obtain a second result;
   comparing the first result to the second result and determining that the first result and the second result are identical; and
   characterizing the query as safe responsive to determining that the first result and the second result are identical.

2. The method of claim 1 further comprising:
   identifying another query;
   executing the another query another first time on other data comprising another sensitive tuple and further tuples to thereby obtain another first result;
   executing the another query another second time on other different data comprising the further tuples but not the another sensitive tuple to thereby obtain another second result;
   comparing the another first result to the another second result and determining that the another first result is not identical to the another second result; and
   characterizing the another query as unsafe responsive to determining that the another first result is not identical to the another second result.

3. The method of claim 1 wherein the data on which the query is executed the first time is a table comprising the sensitive tuple and the different data on which the query is executed the second time is another table from which the sensitive tuple has been removed.

4. The method of claim 3, further comprising:
rewriting the query to obtain a rewritten query that removes the sensitive tuple from the table to obtain the another table, wherein executing the query the second time comprises executing the rewritten query.

5. The method of claim 4 wherein the query is rewritten by adding a predicate to the query to obtain the rewritten query.

6. The method of claim 1, further comprising:
determining that a further query is subsumed by the query; and
characterizing the further query as safe based on the further query being subsumed by the query.

7. The method of claim 6, wherein the characterizing the further query as safe is performed without executing the further query.

8. One or more computer memory devices or storage devices storing computer-executable instructions which, when executed by at least one processing unit of a computing device, cause the at least one processing unit to perform acts comprising:
identifying a query;
executing the query a first time on data comprising a sensitive tuple and other tuples to thereby obtain a first result;
executing the query a second time on different data comprising the other tuples but not the sensitive tuple to thereby obtain a second result;
comparing the first result to the second result and determining that the first result and the second result are identical; and
characterizing the query as safe responsive to determining that the first result and the second result are identical.

9. The one or more computer memory devices or storage devices of claim 8, the acts further comprising:
identifying another query;
executing the another query another first time on other data comprising another sensitive tuple and further tuples to thereby obtain another first result;
executing the another query another second time on other different data comprising the further tuples but not the another sensitive tuple to thereby obtain another second result;
comparing the another first result to the another second result and determining that the another first result is not identical to the another second result; and
characterizing the another query as unsafe responsive to determining that the another first result is not identical to the another second result.

10. The one or more computer memory devices or storage devices of claim 8, the acts further comprising:
identifying another query that appears in a workload before the query;
determining that the another query is subsumed by the query; and
responsive to the determining, reordering the workload so that the query appears before the another query in the workload.

11. The one or more computer memory devices or storage devices of claim 10, wherein the reordering comprises creating a subsumption graph with multiple nodes each having corresponding queries in the workload, including at least a first node representing the query and a second node representing the another query.

12. The one or more computer memory devices or storage devices of claim 11, the acts further comprising:
using a directed edge in the subsumption graph to represent that the another query is subsumed by the query.

13. The one or more computer memory devices or storage devices of claim 12, wherein the reordering comprises performing a topological sort of the subsumption graph.

14. A computing system comprising:
at least one processing unit; and
one or more computer memory devices or storage devices storing computer-executable instructions which, when executed by the at least one processing unit, cause the at least one processing unit to:
identify a query;
perform an evaluation of whether a first result of executing the query a first time on first data will differ from a second result of executing the query a second time on different data, wherein the first data comprises a sensitive tuple and the second data does not comprise the sensitive tuple; and
characterize the query as safe or unsafe based on the evaluation.

15. The computing system of claim 14, wherein the evaluation is performed by executing the query the first time and the second time.

16. The computing system of claim 15, wherein a first version of the query is executed the first time and a second version of the query is executed the second time, the second version of the query being a rewritten version of the first version of the query.

17. The computing system of claim 14, wherein the evaluation is performed on a first version of the query having a first logical plan and a second version of the query having a second logical plan.

18. The computing system of claim 17, wherein the computer-executable instructions cause the at least one processing unit to:
perform the evaluation by determining whether the second logical plan is reachable from the first logical plan.

19. The computing system of claim 18, wherein the computer-executable instructions cause the at least one processing unit to:
in an instance when the evaluation indicates that the second logical plan is reachable from the first logical plan, characterize the query as safe.

20. The computing system of claim 18, wherein the computer-executable instructions cause the at least one processing unit to:
in an instance when the evaluation indicates that the second logical plan is not reachable from the first logical plan, execute the first version of the query to obtain the first result and the second version of the query to obtain the second result.

* * * * *